June 12, 1934. E. L. UDELL Re. 19,211

HEADLIGHT RIM

Original Filed Feb. 25, 1931

INVENTOR
Earl L. Udell
BY
Braselton, Whitcomb & Davis
ATTORNEYS.

Reissued June 12, 1934

Re. 19,211

UNITED STATES PATENT OFFICE 19,211

HEADLIGHT RIM

Earl L. Udell, Tallahassee, Fla., assignor of one-third to Robert Harvell and one-third to Harry W. Thompson, Tallahassee, Fla.

Original No. 1,827,305, dated October 13, 1931, Serial No. 518,065, February 25, 1931. Application for reissue October 26, 1931, Serial No. 571,242

4 Claims. (Cl. 240—8.4)

This invention relates to automobile headlights and particular to automobile headlight casings provided with indicating means positioned therein to indicate to the driver of an automobile whether or not his headlights are illuminated.

An object of the invention is to produce a headlight rim in such a manner that said rim will not only perform its function of retaining the headlight lens in position, but one which will also divert a portion of the incidental rays of the lamp and reflect said incidental rays in such a manner that they will be visible to the occupants of the automobile and consequently be a visible indication, at all times, of the condition of the headlight.

It is a well known fact that one headlight of an automobile often burns out or its filament or lamp socket is jarred loose so that one headlight is extinguished, and inasmuch as it is difficult for the driver to know when this condition occurs, it constitutes a serious menace to on-coming vehicles, and it is with this thought in view that the present invention was made. The problem has been attacked in a number of ways, but the prevailing thought has been to devise a device which would reflect back to the driver some of the light rays of his headlight so as to constitute a visible signal. Many of these prior devices consist of reflectors, which depend into the path of the light rays, or hoods mounted on the lamp rim for accomplishing this purpose.

These devices of the prior art, however, have not afforded a practical solution to the problem because of their structure which has either been too complicated to be useful or which has obscured a large amount of available light rays.

I, on the other hand, have modified the conventional headlight rim in such a manner that there is no absorption of any useful projected light rays, and have devised a structure which is unitary, practical, and weather-proof.

Referring to the drawing, it will be seen that Fig. 1 is a front plan view of a headlight rim embodying the subject matter of this application.

Figure 1:
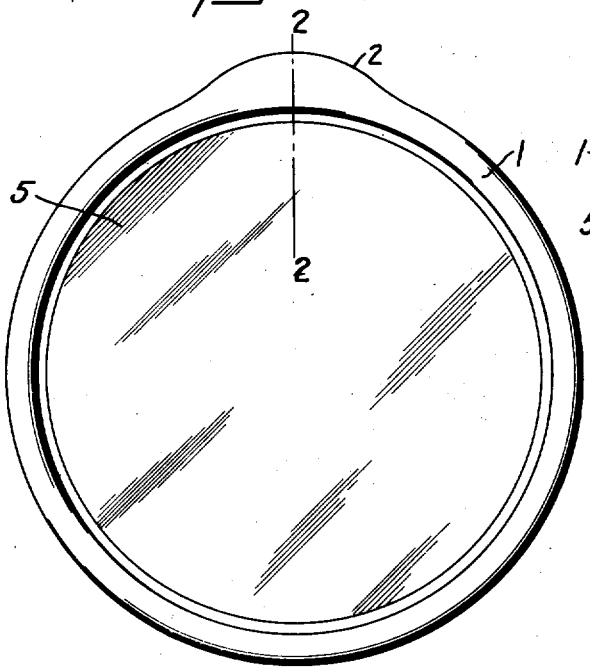
Figure 2:
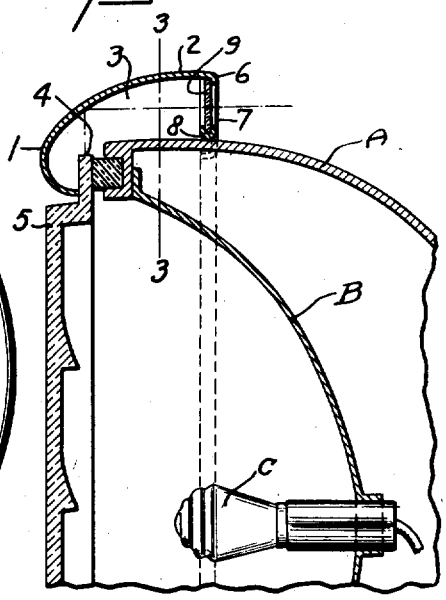
Fig. 2 is a vertical section taken on line 2—2 of Fig. 1.
Figure 3:
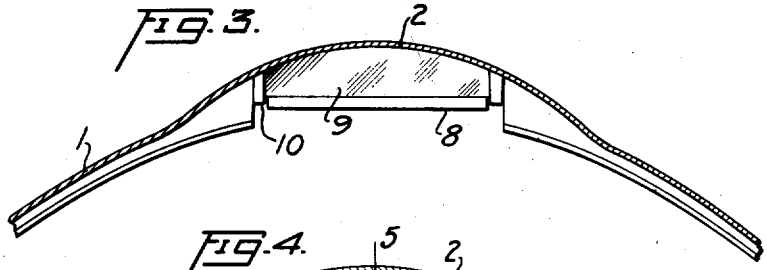
Fig. 3 is a vertical section taken on line 3—3 of Fig. 2.

By referring to Figs. 1, 2 and 3, it will be apparent that the invention consists of a conventional headlight casing A, reflector B and source of illumination or lamp bulb C. Surrounding the forward extremities of casing A and reflector B is a headlight rim 1, having its uppermost portion 2 pressed outwardly beyond the normal periphery of the rim so as to form an interiorally enlarged portion or cavity 3. The forward portion of the rim 1 extends inwardly and abuts the radial flange 4 of a conventional headlight lens 5. The rearward portion of the rim 1 at the pressed out section 2 is bent at right angles as indicated by numeral 6 and an opening 7 punched out of this portion of the metal. As denoted by numeral 8, the rearward extension of the rim is turned back upon itself so as to form a clip or holding means for a colored glass 9 which covers the opening 7.

As specifically shown in Fig. 3, the indicator glass 9 is retained by the bent portion 8 on its lower edge, while the sides of the glass 9 are retained by bent portions 10 which clamp the sides of the glass. The modern headlight rim is constructed of pressed, noncorrosive alloys which assume considerable surface brilliance when they are polished or burnished. Consequently, the interior of the rim, including the chamber portion 3, is highly polished and capable of acting as a reflector. Referring to Fig. 2, it will be seen that, when the electric lamp positioned behind the lens 5 in the headlight is energized, its rays will be projected by the customary reflector in a general forward path. However, some of the so called incidental rays will be projected through the radial flange 4 of the lens illuminating it, and will continue outwardly until these rays strike upon the curved polished surface 3, where they will be deflected in a generally rearward direction and illuminate indicator glass 9. This indicator glass being mounted at the rear of the uppermost portion of the headlight is visible to the driver, and consequently the driver has constantly before him an illuminated colored signal light when the headlights are burning. If one of the headlights is extinguished for any reason whatsoever, it is instantly called to the driver's attention as the glass 9 is no longer illuminated.

As disclosed in these figures of the drawing, it will be noted that I have produced a headlight indicator which in no manner obscures any forwardly projecting rays of the headlight, and one which is completely weather-proof.

Figure 4:
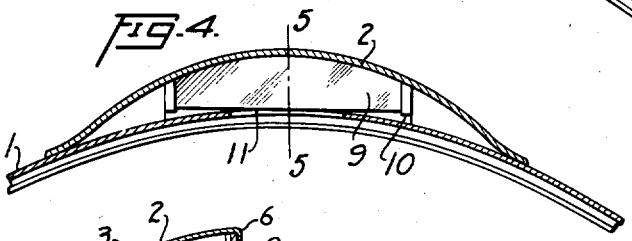
Fig. 4 is a sectional view of a modification of the invention.
Figure 5:
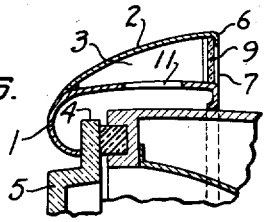
Fig. 5 is a vertical section taken on line 5—5 of the modified structure.

As disclosed in Figs. 4 and 5, the modified form consists of an arrangement which instead of being pressed out of the rim metal, the projection 2 and chamber 3 are composed of a separate strip of metal, spot welded or brazed to the upper portion of the headlight rim 1. The light rays which are carried through radial rim 4 of the lens project upwardly through an opening 11 cut in the rim 1 and are projected upwardly as before described. Fig. 4 shows the preferred manner of retaining the indicator glass 9 and it will be noted that the glass rests on the outer periphery of the rim and is retained by clips 10 identical to those illustrated in Fig. 3.

What I claim is:

1. An automobile headlight rim having an integral radial pressed-out portion formed therein and lying totally within the transverse width thereof and joined smoothly with the outline of the rim, the front of said rim and pressed-out portion being continuous and unbroken, and a light transmitting opening formed in the rear face of said radial pressed-out portion and lying substantially in the plane of the rear edge of the rim.

2. An automobile headlight including a rim member adapted to retain a lens in position in said headlight, the said rim being pressed out at one portion beyond its normal radius to provide an integral symmetrical protuberance thereon, the front of said rim adjacent the protuberance being unbroken and abutting the lens near its periphery, while the rear of the rim adjacent the protuberance is radially extended to form a sight opening lying substantially in the plane of the rear edge of the rim and a light positioned behind the lens adapted to project all of its direct rays therethrough, and a portion of its incidental rays outwardly through the periphery of said lens at the place of the protuberance so as to be visible through the sight opening from the rear of the headlight.

3. A combined automobile headlight rim and light indicator, comprising a substantially cylindrical body having a front inturned annular flange adapted to engage the usual front lens of the headlight, the upper part of the cylindrical body being provided with a turned-out portion projecting outwardly from the rim in a radial direction producing a protuberance to receive light from the edge portion of the lens when the usual bulb of the headlight is lit; the front of the rim and protuberance and the lateral portions of the protuberance being unbroken and continuous and joined smoothly with the outline of the rim; said protuberance being provided with a light emitting opening in the rear thereof above the cylindrical body of the rim and lying substantially in the plane of the rear edge of the rim, and a light emitting cover for said opening.

4. An automobile headlight having a lens-holding portion, said portion having an integral radial pressed-out part formed therein and lying totally within the transverse width thereof, and joined smoothly with the outline of the lens-holding portion, the front of said lens-holding portion and pressed-out part being continuous and unbroken, and a light transmitting opening formed in the rear face of said radial pressed-out part.

EARL L. UDELL.